March 1, 1960  E. B. PHILLIPS  2,927,225
STEP SWITCH CONTROL SYSTEM
Filed Sept. 18, 1956  3 Sheets-Sheet 1

INVENTOR.
EMORY B. PHILLIPS
BY
ATTORNEYS

March 1, 1960 E. B. PHILLIPS 2,927,225
STEP SWITCH CONTROL SYSTEM
Filed Sept. 18, 1956 3 Sheets-Sheet 2

INVENTOR.
EMORY B. PHILLIPS
BY Ostrolenk, Faber,
Gerb, & Soffen
ATTORNEYS

March 1, 1960 E. B. PHILLIPS 2,927,225
STEP SWITCH CONTROL SYSTEM
Filed Sept. 18, 1956 3 Sheets-Sheet 3

INVENTOR.
EMORY B. PHILLIPS
BY Ostrolenk, Faber,
Gerb & Soffen
ATTORNEYS

United States Patent Office 2,927,225
Patented Mar. 1, 1960

2,927,225

STEP SWITCH CONTROL SYSTEM

Emory Bertram Phillips, Lawrence, Kans.

Application September 18, 1956, Serial No. 610,608

10 Claims. (Cl. 307—115)

My invention relates to an improvement in A.-C. network analyzers and more specifically relates to an automatic load adjuster for the load units of the analyzer.

Network analyzers of the type set forth in U.S. Patent No. 2,487,942 and in copending application Serial No. 433,098, filed May 28, 1954, now Patent No. 2,864,994, are analogue computers for predicting the behavior of electrical utility networks.

Thus a network analyzer consists primarily of a plurality of electrical components which may be interconnected to form various circuit patterns which simulate an electrical system network to a greatly reduced power scale. By way of example, the more important components in the analyzer would be power generating apparatus, tap-changing transformers, instruments, and adjustable impedances for the representation of transmission lines and for the representation of system loads.

In general, the load units which are the units to which this invention is directed, consist of an adjustable resistive circuit connected in parallel with an inductive circuit, power being supplied to the load unit by an adjustable ratio load unit transformer, the primary of which is connected to a point in the analyzer network and to a common return circuit referred to as a neutral bus.

A load on the system network which is to be imitated is simulated on the analyzer network by setting the resistive circuit to an equivalent ohmic value so that the resistive power taken from a point of the analyzer network will be proportional to those taken from the corresponding bus of the system network being imitated. In a like manner, the inductive circuit is adjusted to an equivalent reactive value so that the reactive volt-amperes taken from the analyzer network bus will be proportional to those taken from the corresponding system bus.

In determining the required resistive and reactive values for a plurality of load units, which are to be used in the network or in the calibration of the dial plates of the load units which set up equivalent circuits, it is assumed that the same voltage is available for each of the load units. That is to say, it is assumed that a voltage value which will be referred to as a 100% voltage is impressed across each of the load units. However, due to unequal voltage drops existing between the generating sources and the various load points in the network, the 100% voltage will not exist at each of the load points, some buses being greater than and some being less than this 100% voltage value.

Since this voltage difference cannot be anticipated, it is therefore necessary to make several successive readjustments of the load units interspersed with adjustments of the power generating apparatus in order to maintain a desired schedule of distribution of generation among the several system generating stations.

In the past, this adjustment which is commonly known as "load trimming" was accomplished by altering the turns ratio of the load-unit transformer. That is to say, the position of a knob attached to the shaft of the transformer's tap-changing switch varies the value of the turns ratio in use. In order to monitor this adjustment, a miniature volt meter was mounted on the panel of each load unit and connected to either the primary or secondary winding of the load unit transformer and indicated the amount of change in the tap switch which would be required to have 100% voltage impressed on the load unit's impedance.

This manual load trimming operation, however, is highly undesirable in view of the great lengths of time consumed thereby. By way of example, it has been found that to correctly manually adjust the loads requires between ten and twenty minutes, the time varying with the number of load units. This adjustment must then be repeated, usually about three successive times, thus requiring approximately forty-five minutes to obtain proper equivalent system loading. If then, three or four power flow or voltage regulation investigations are made per day, the total time required for trimming of load units can amount to a total of two or three hours.

As will be seen hereinafter, my novel invention overcomes this time consuming trimming operation by providing automatically operable means for maintaining the loads to the values set on their respective adjusting knobs, regardless of the voltage on the bus to which the load unit is connected. Hence the loads will be maintained at their proper value during the period of adjusting the total system loading among the various generating stations. At the completion of generating station adjustment, the network analyzer will indicate without further delay, the system network performance for the assumed operating conditions.

If desired, a limit indicating means can be connected in the system to perceivably indicate a load variation beyond predetermined limits. By way of example, two signal lights may be provided with each load unit, one being illuminated when the bus voltage decreases below 90% while the other becomes illuminated if the bus voltage increases above 110%. Furthermore, my novel invention provides an easy switch-over to manual operation if for any reason the automatic device becomes inoperative. Further indicating means could also be provided which offer a visual indication of the voltage on the load bus of each load unit with respect to calibrated voltage marks on the dial of any switch. Thus a preliminary survey of loading point voltages may be quickly made without the necessity of switching the points to a master volt meter to observe these voltages.

In one preferred embodiment of my novel invention, the tap-changing switch of the load unit transformer is controlled in accordance with the position of a contact type volt meter connected across the load. That is to say, a pair of stationary contacts are positioned with respect to the pointer of a volt meter carrying a movable contact whereby engagement between the movable contact and one of the stationary contacts when the movable contact indicates an increasing voltage, will cause subsequent rotation of the tap-changing switch so as to decrease the voltage impressed across the load and return the movable contact connected to the pointer back to a predetermined position.

In a similar manner, a decreasing voltage will move the pointer contact into engagement with the other stationary contact so as to cause subsequent motion of the tap-changing switch to increase the voltage impressed across the load in it and bring the pointer back to its predetermined position. Clearly by adjusting the position of the stationary contacts of the contact type volt meter, one can selectively adjust and maintain the operating voltage for the load unit.

Accordingly, a primary object of my invention is to provide a novel automatic load adjuster for a network analyzer.

Another object of my invention is to provide a novel automatic load adjuster for a network analyzer which will automatically and adjustably maintain the voltage of each of a plurality of load units at a predetermined value.

Still another object of my invention is to provide a novel automatic load adjuster for a network analyzer wherein the position of a contact type volt meter controls the position of a tap-changing switch in such a manner as to maintain a predetermined voltage reading on the contact type volt meter.

Yet another object of my invention is to provide a limit indicating means for an automatic load adjuster which perceivably indicates a load variation beyond a predetermined limit.

These and other objects of my invention will become apparent from the following description when taken in conjunction with the drawings in which:

Figure 1 schematically indicates the manner in which my novel automatic load adjuster may be connected in relation to a single load unit of a network analyzer.

Figure 1:
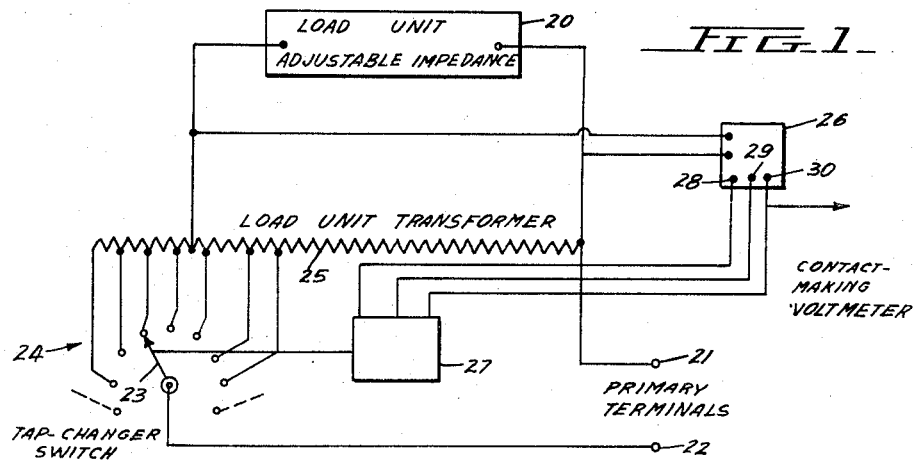

Figure 1 schematically illustrates the manner in which a single load unit adjustable impedance 20 is energized from a generated voltage appearing at the primary terminals 21 and 22. More specifically, terminal 22 is connected to the movable arm 23 of a tap-changing switch seen generally at 24. The stationary contacts of tap-changing switch 24 are then connected to various taps of the load unit transformer 25 which in the case of Figure 1 is an autotransformer connected across load unit 20. Clearly by varying the position of movable arm 23 the primary winding of load unit transformer 25 will have an increased or decreased number of turns to thereby decrease or increase respectively the voltage impressed on load unit 20.

As described heretofore, the correct voltage value of a plurality of load units such as load unit 20 as determined by the position of tap-changing switch 24 has been manually controlled to a 100% voltage value by adjustment and readjustment of each of the tap-changing switches.

In accordance with my novel invention, this function may be automatically accomplished by presetting a contact type volt meter 26 which measures the voltage of load unit 20 to automatically control the position of contact arm 23 through the operating mechanism schematically shown in Figure 1 as device 27. More specifically, when the voltage across load unit 20 is too high, points 28 and 29 of the contact type volt meter will be interconnected to thereby initiate operation of mechanism within device 27 to drive contact arm 23 so as to decrease the voltage across load unit 20 to a predetermined value.

In a similar manner, when the voltage across load unit 20 is too low, points 29 and 30 of contact type volt meter 26 will be interconnected, to thereby initiate operation of mechanism within device 27 which will in turn drive contact arm 23 of tap-changing switch 24 to increase the voltage across load 20 to a predetermined value.

Figure 2:
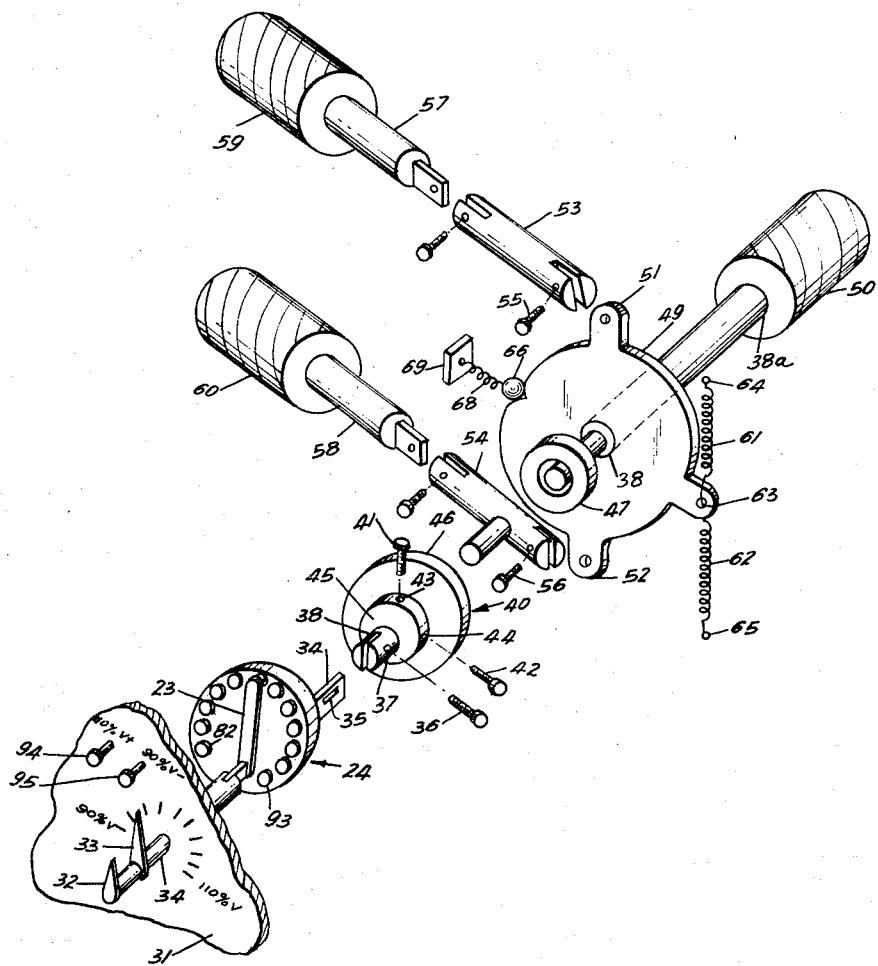
Figure 2 is an exploded perspective view of a portion of the mechanism used in my novel invention.
Figure 3:
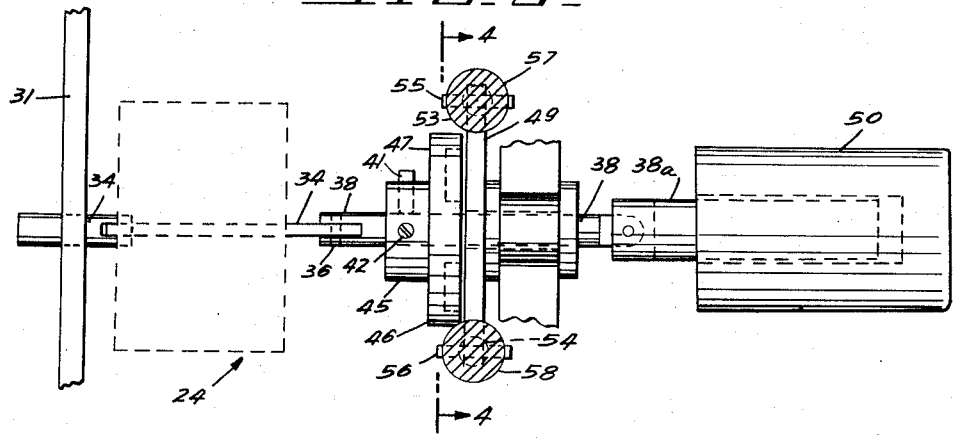
Figure 3 is a side cross-sectional view of the mechanism of Figure 2.
Figure 4:
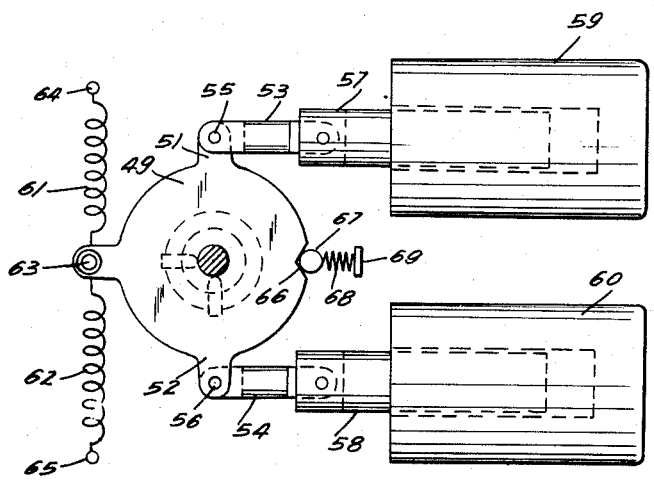
Figure 4 is a view of Figure 3 taken across the lines 4—4.

Figures 2, 3 and 4 specifically illustrate one embodiment of a portion of the mechanism which could be utilized to drive the tap-changing switch 24 of Figure 1.

As is best seen in Figures 2 and 3, a load panel 31 has a manually operating knob 32 and indicating pointer 33 fastened to a shaft 34 which protrudes through the panel 31. A tap-changing switch seen generally at 24 is then mounted internally of panel 31 with its contact arm 23 fastened to shaft 34 so as to be rotated therewith.

The end of shaft 34 is as most clearly seen in Figure 2 provided with a rectangular slot 35 which cooperates with a pin means 36 which is inserted in aperture 37 of shaft 38. Shaft 38 is further provided with a slot for accepting the end of shaft 34 in such a manner that shaft 38 is axially movable with respect to the shaft 38, its movement being limited by the engagement of pin 36 and each end of rectangular slot 35.

A movable clutch body 40 is then rigidly connected to shaft 38 by screw means such as screw means 41 and 42 which cooperate with openings 43 and 44 respectively of hub 45. An annular plate 46 which could be an integral part of hub 45 then has an annular slot in the surface away from hub 45 as may be best seen in Figure 3, which slot receives the clutch material 47 as seen in Figure 2.

A driving clutch disk 49 is keyed to the shaft 38 so as to be rotatable therewith while being axially movable with respect to the shaft. Thus, driving clutch disk 49 is engageable by clutch material 47 when clutch body 40 is moved to a clutch position. It is to be noted that body 40 which is rigidly connected to shaft 38 may be moved into and out of engagement with clutch disk 49 in view of the slotted connection between pin 36 and rectangular slot 35 of member 34.

In order to control the axial position of shaft 38 and hence the clutch position of body 40, a portion 38a extends into the opening of a solenoid 50 which is energizable in a manner as will be set forth hereinafter.

Driving clutch disk 49 is further constructed to have protruding ears 51 and 52 pivotally connected to shafts 53 and 54 respectively by pins 55 and 56 respectively. Each of shafts 53 and 54 are then in turn connected to solenoid plungers 57 and 58 respectively of solenoids 59 and 60 respectively, which are energized in a manner to be indicated hereinafter. Clearly, when plunger 57 is drawn into solenoid 59 while solenoid 50 is energized to operatively connect plate 49 to contact arm 23, contact arm 23 will be rotated in a counterclockwise direction.

In a similar manner, when plunger 58 is drawn into solenoid 60 and clutch disk 49 is operatively connected to contact arm 23, contact arm 23 will be rotated in clockwise direction.

When solenoid coil 50 is unenergized, however, the contact arm 23 is seen to be disconnected from the above described operating mechanism since the clutch disk 40 is disconnected from clutch disk 49 and the position of contact arm 23 can be manually controlled at the knob 32.

After deenergization of solenoid 59 or 60, return of their plungers 57 or 58 is assured by means of the tension springs 61 and 62 which are connected to protruding ear 63 of clutch disk 49 and the relatively stationary points 64 and 65 respectively.

It is further seen in Figures 2 and 4 that detent means such as the detent 66 is provided for the clutch disk 49 which detent cooperates with ball member 67 which is biased into engagement with detent 66 by the compression spring 68 fastened to the relatively fixed structural member 69.

Figure 5:
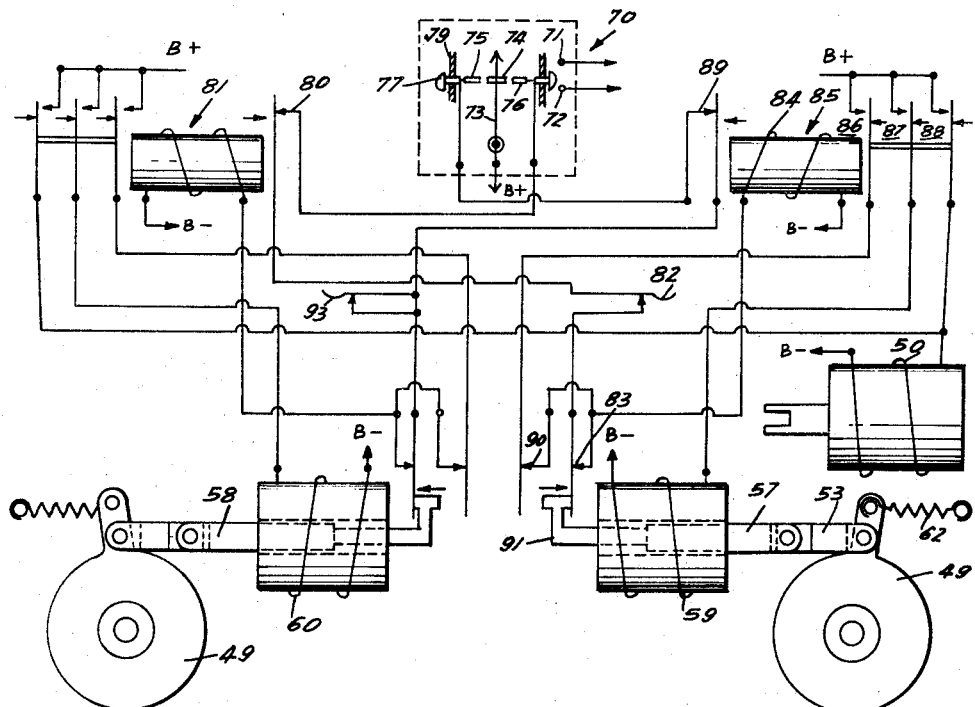
Figure 5 is a detailed schematic view which shows a contact type volt meter and the relaying means by which the pointer position of the contact volt meter controls the tap-changing switch operating mechanism.

The manner in which the mechanism of Figures 2, 3 and 4 is utilized in my novel invention may now be understood with reference to Figure 5 which schematically illustrates this mechanism in conjunction with the relay system which energizes the mechanism from a load measuring means which, in the case of Figure 1, would measure the voltage of load unit 20. More specifically, Figure 5 shows the load measuring means as being comprised of a contact type volt meter seen generally in the dotted box 70. The input to the contact type volt meter 70 is at the input terminals 71 and 72 which could be connected to measure the input load voltage or some function thereof.

The pointer 73 of volt meter 70 is then seen to carry a movable contact 74 therewith, which movable contact cooperates with stationary contacts 75 and 76. Each of contacts 75 and 76 may be adjustably positioned in any desired manner so as to effect contact engagement with respect to the movable contact 74 at any position of the pointer 73. For example, contacts 75 and 76 could be adjustably positioned by means of the adjusting screws 77 and 78 respectively which carry contacts 75 and 76 respectively. Hence, by threading adjusting screw 77 into its supporting member 79, contact engagement between movable contact 74 and stationary contact 75 would occur at a different angle than that shown in Figure 5 while a similar adjustment may be made of contact 76.

The operation of Figure 5 is as follows, where it is to be understood that an auxiliary direct voltage source supplying a positive potential indicated schematically as B+ and a negative potential indicated schematically as B— is utilized. The complete circuit connection of this voltage source, however, is not shown in Figure 5 in order to simplify the diagram. When pointer 73 of volt meter 70 is rotated clockwise by too high a voltage impressed across terminals 71 and 72, movable contact 74 will be brought into engagement with stationary contact 76. This contact engagement will then complete the circuit between a voltage source having a high potential point indicated as B+ connected to the contact 74, stationary contact 76, contact 80 of the relay seen generally at 81, contact 82, contact 83, relay coil 84 of the relay seen generally at 85 and to the negative potential point B— of the energy source.

Energization of relay coil 84 causes contact closure of relay contacts 86, 87 and 88 so as to energize solenoid 50 which, as is seen in Figure 2, and Figure 3, causes engagement of clutch disks 40 and 49 and at the same time allows energization of solenoid 59 through the contact 87. It is noted that solenoid 59 has been described in Figure 2 as being the solenoid which effects counterclockwise rotation of tap-changing switch 23 responsive to energization thereof.

Returning now to Figure 5, it is clear that in view of energization of both the clutch solenoid 50 and the operating mechanism solenoid 59, that plunger 57 will be drawn into solenoid 59 so as to rotate clutch disk 49 in a counterclockwise direction against the biasing force of tension spring 62. Clearly the tap-changing switch will be rotated with the clutch disk 49 through a predetermined angle which angle could correspond to the angle between adjacent stationary contacts of the switch 24 of Figure 2.

In moving the switch arm 23 of tap-changing switch 24 from one contact to the next, it is to be understood that energization of the transformer connected to the switch will be momentarily lost, thereby causing volt meter 70 of Figure 5 to release movable contact 74 from stationary contact 76. Relay 85, however, is of the type to maintain contacts 86, 87 and 88 engaged for a predetermined length of time to thereby prevent the loss of a complete stroke of plunger 57 in its solenoid coil 59.

Furthermore, during this momentary loss in energization of the transformer, it is possible that movable contact 74 would engage stationary contact 75 to effect a subsequent operation of solenoid coil 60. This condition, however, is prevented since contact 89 of relay 85 is opened and is maintained open responsive to energization of coil 84.

Upon the completion of the pull stroke of solenoid 57, an extension 91 of plunger 57 will cause contact 90 to be opened, thereby opening the circuit of the coil 84 and deenergize relay 85. Upon opening of the contacts of relay 85, both the clutch coil 50 and the operating mechanism coil 89 will be deenergized and plunger 57 will be pulled into its inoperative position shown in Figure 5 by the tension spring 62. On return of the mechanism to an inoperative position, ball member 67 will engage detent 66, thus maintaining operating plate 49 in its normal at-rest position.

Thus as may be seen in Figure 2, after the operation described in conjunction with Figure 5, the tap-changing switch 24 will have been moved by one contact position so as to decrease the voltage impressed on the load unit. This decrease in voltage will then be measured by the volt meter 70 in Figure 5 and if found to be sufficient, the contacts 74 and 76 will be disengaged. If, however, additional decrease is required, the contacts will still be engaged and the complete cycle previously described will be repeated so as to further alter the position of switch arm 23 of the tap-changing switch 24.

In the event that there is a decrease in secondary voltage of the load unit transformer, the contact 74 would then engage the stationary contact 75. This engagement of contact 75 would in a similar manner to that described for engagement between contacts 74 and 76, cause energization of clutch coil 50 and solenoid coil 60 and movement of plunger 58 which would drive the clutch disk 49 in a clockwise direction. The operation of clutch disk 49 in a clockwise direction would therefore serve to increase the voltage impressed across the load unit which increase would then cause pointer 73 to return to a predetermined position.

The operation of the solenoid coil 60 is similar to that described in conjunction with solenoid coil 59 in every respect, including the step operation wherein the coil 60 is alternately energized and deenergized until pointer 73 assumes a correct position.

As may be further seen in Figure 5, limit switch contacts 82 and 93 are connected in the relay circuit to cause illumination of signal lights 94 and 95 of Figure 2 when the load voltage exceeds certain predetermined limits.

Hence, the contacts 82 and 93 which could be carried by switch 24, as is seen in Figure 2, would be engaged by movable arm 23 after excessive movement thereof between the two limiting positions, this condition being visually indicated by the lighting of signal lamps 94 and 95 through any desired circuitry.

Although I have here described preferred embodiments of my novel invention, many variations and modifications will now be apparent to those skilled in the art and I prefer, therefore, to be limited not by the specific disclosure herein set forth, but only by the appended claims.

I claim:

1. An operating mechanism for selectively moving a member through a plurality of discrete positions in a forward or reverse direction; said mechanism including a first and second operating means energizable for moving said member in said forward and said reverse direction respectively for a distance between two of said discrete positions in their respective directions, and a clutch having an input member and an output member and means energizable for selectively connecting and disconnecting said input and output members; said output member and said input member being connected responsive to energization of said energizable means of said clutch; and operating energizing means for selectively energizing both of said first operating means and said energizable means of said clutch or said second operating means and said energizable means of said clutch; said output member of said clutch being operatively connected to said member; said input member of said clutch being operatively connected to said first and second operating means; said clutch permitting return of either of said first or second operating means to a normal de-energized position after a discrete movement of said input member by either of said first or second operating means.

2. An operating mechanism for selectively moving a member through a plurality of discrete positions in a forward or reverse direction; said mechanism including a first and second operating means energizable for moving said member in said forward and said reverse direction respectively for a distance between two of said discrete positions in their respective directions, and a clutch having an input member and an output member and means energizable for selectively connecting and disconnecting said input and output members; said output member and said input member being connected responsive to energization of said energizable means of said clutch; and operating energizing means for selectively energizing both of said first operating means and said energizable means of said clutch or said second operating means and said energizable means of said clutch; said output member of said clutch being operatively connected to said member; said input member of said clutch being operatively connected to said first and second operating means; said clutch permitting return of either of said first or second operating means to a normal de-energized position after a discrete movement of said input member by either of said first or second operating means; said first and second operating means being further constructed to de-energize said operating energizing means after their motion from a first discrete position to a second discrete position.

3. An operating mechanism for selectively moving a member through a plurality of discrete positions in a forward or reverse direction; said mechanism including a first and second operating means energizable for moving said member in said forward and said reverse direction respectively for a distance between two of said discrete positions in their respective directions, and a clutch having an input member and an output member and means energizable for selectively connecting and disconnecting said input and output members; said output member and said input member being connected responsive to energization of said energizable means of said clutch; and operating energizing means for selectively energizing both of said first operating means and said energizable means of said clutch or said second operating means and said energizable means of said clutch; said output member of said clutch being operatively connected to said member; said input member of said clutch being operatively connected to said first and second operating means; said clutch permitting return of either of said first or second operating means to a normal de-energized position after a discrete movement of said input member by either of said first or second operating means; biasing means for said input member of said clutch to normally maintain said input member in a predetermined position; said biasing means returning said input member to said predetermined position after operation of one of said first or second operating means independently of the position of said output member.

4. An operating mechanism for selectively moving a member through a plurality of discrete positions in a forward or reverse direction; said mechanism including a first and second operating means energizable for moving said member in said forward and said reverse direction respectively for a distance between two of said discrete positions in their respective directions, and a clutch having an input member and an output member and means energizable for selectively connecting and disconnecting said input and output members; said output member and said input member being connected responsive to energization of said energizable means of said clutch; and operating energizing means for selectively energizing both of said first operating means and said energizable means of said clutch or said second operating means and said energizable means of said clutch; said output member of said clutch being operatively connected to said member; said input member of said clutch being operatively connected to said first and second operating means; said clutch permitting return of either of said first or second operating means to a normal de-energized position after a discrete movement of said input member by either of said first or second operating means; said first and second operating means being further constructed to de-energize said operating energizing means after their motion from a first discrete position to a second discrete position; biasing means for said input member of said clutch to normally maintain said input member in a predetermined position; said biasing means returning said input member to said predetermined position after operation of one of said first or second operating means independently of the position of said output member.

5. An operating mechanism for selectively moving a member through a plurality of discrete positions in a forward or reverse direction; said mechanism including a first and second operating means energizable for moving said member in said forward and said reverse direction respectively for a distance between two of said discrete positions in their respective directions, and a clutch having an input member and an output member and means energizable for selectively connecting and disconnecting said input and output members; said output member and said input member being connected responsive to energization of said energizable means of said clutch; and operating energizing means for selectively energizing both of said first operating means and said energizable means of said clutch or said second operating means and said energizable means of said clutch; said output member of said clutch being operatively connected to said member; said input member of said clutch being operatively connected to said first and second operating means; said clutch permitting return of either of said first or second operating means to a normal de-energized position after a discrete movement of said input member by either of said first or second operating means; said first and second operating means comprising solenoid plungers movable through a predetermined stroke.

6. An operating mechanism for selectively moving a member through a plurality of discrete positions in a forward or reverse direction; said mechanism including a first and second operating means energizable for moving said member in said forward and said reverse direction respectively for a distance between two of said discrete positions in their respective directions, and a clutch having an input member and an output member and means energizable for selectively connecting and disconnecting said input and output members; said output member and said input member being connected responsive to energization of said energizable means of said clutch; and operating energizing means for selectively energizing both of said first operating means and said energizable means of said clutch or said second operating means and said energizable means of said clutch; said output member of said clutch being operatively connected to said member; said input member of said clutch being operatively connected to said first and second operating means; said clutch permitting return of either of said first or second operating means to a normal de-energized position after a discrete movement of said input member by either of said first or second operating means; said first and second operating means comprising solenoid plungers movable through a predetermined stroke; said member, said ouput member, and said input members being rotatable shafts.

7. An operating mechanism for selectively moving a member through a plurality of discrete positions in a forward or reverse direction; said mechanism including a first and second operating means energizable for moving said member in said forward and said reverse direction respectively for a distance between two of said discrete positions in their respective directions, and a clutch having an input member and an output member and means energizable for selectively connecting and disconnecting said input and output members; said output member and said input member being connected responsive to energization of said energizable means of said clutch; and operating energizing means for selectively energizing both of said first operating means and said energizable means of said clutch or said second operating means and said energizable means of said clutch; said output member of said clutch being operatively connected to said member; said input member of said clutch being operatively connected to said first and second operating means; said clutch permitting return of either of said first or second operating means to a normal de-energized position after a discrete movement of said input member by either of said first or second operating means; said first and second operating means being further constructed to de-energize said operating energizing means after their motion from a first discrete position to a second discrete position; said first and second operating means comprising solenoid plungers movable through a predetermined stroke.

8. A tap changer for a transformer; said tap changer including a movable contact member movable between a plurality of discrete tap positions, a first and second solenoid operating means for moving said movable contact arm in a forward and reverse direction respectively for a discrete distance equal to the distance between adjacent taps, and a clutch having an input member and an output member and means energizable for selectively connecting said input and output members; said input and said output member being connected responsive to energization of said energizable means of said clutch; and control circuit means for selectively energizing both of said first solenoid means and said energizable means of said clutch or both of said second solenoid means and said energizable means of said clutch; said output member of said clutch being operatively connected to said movable contact member; said input member of said clutch being operatively connected to the solenoid plungers of said first and second solenoid means; energization of said first solenoid means and said clutch driving said movable contact member in said forward direction for a distance equal to the distance between a pair of adjacent taps, energization of said second solenoid means and said clutch moving said movable contact member in said reverse direction for a distance equal to the distance between a pair of adjacent taps; said clutch permitting return of the solenoid plungers of either of said first or second solenoid means to a normal de-energized position after discrete movement of said input member of said clutch by either of said first or second solenoid means.

9. A tap changer for a transformer; said tap changer including a movable contact member movable between a plurality of discrete tap positions, a first and second solenoid operating means for moving said movable contact arm in a forward and reverse direction respectively for a discrete distance equal to the distance between adjacent taps, and a clutch having an input member and an output member and means energizable for selectively connecting said input and output members; said input and said output member being connected responsive to energization of said energizable means of said clutch; and control circuit means for selectively energizing both of said first solenoid means and said energizable means of said clutch or both of said second solenoid means and said energizable means of said clutch; said output member of said clutch being operatively connected to said movable contact member; said input member of said clutch being operatively connected to the solenoid plungers of said first and second solenoid means; energization of said first solenoid means and said clutch driving said movable contact member in said forward direction for a distance equal to the distance between a pair of adjacent taps, energization of said second solenoid means and said clutch moving said movable contact member in said reverse direction for a distance equal to the distance between a pair of adjacent taps; said clutch permitting return of the solenoid plungers of either of said first or second solenoid means to a normal de-energized position after discrete movement of said input member of said clutch by either of said first or second solenoid means; the solenoid plungers of said first and second solenoid means being constructed to de-energize said control circuit means after their motion from a de-energized position to an energized position.

10. A tap changer for a transformer; said tap changer including a movable contact member movable between a plurality of discrete tap positions, a first and second solenoid operating means for moving said movable contact arm in a forward and reverse direction respectively for a discrete distance equal to the distance between adjacent taps, and a clutch having an input member and an output member and means energizable for selectively connecting said input and output members; said input and said output member being connected responsive to energization of said energizable means of said clutch; and control circuit means for selectively energizing both of said first solenoid means and said energizable means of said clutch or both of said second solenoid means and said energizable means of said clutch; said output member of said clutch being operatively connected to said movable contact member; said input member of said clutch being operatively connected to the solenoid plungers of said first and second solenoid means; energization of said first solenoid means and said clutch driving said movable contact member in said forward direction for a distance equal to the distance between a pair of adjacent taps, energization of said second solenoid means and said clutch moving said movable contact member in said reverse direction for a distance equal to the distance between a pair of adjacent taps; said clutch permitting return of the solenoid plungers of either of said first or second solenoid means to a normal de-energized position after discrete movement of said input member of said clutch by either of said first or second solenoid means; biasing means for said clutch input member; said biasing means of said clutch input member normally maintaining said input member in a predetermined position; said biasing means returning said input member to said predetermined position after operation of one of said first or second solenoid means independently of the position of said movable contact member.

References Cited in the file of this patent

UNITED STATES PATENTS

| | | |
|---|---|---|
| 2,009,383 | Blume | July 30, 1935 |
| 2,026,356 | Palme | Dec. 31, 1935 |
| 2,200,989 | Lennox et al. | May 14, 1940 |
| 2,693,573 | Perkins | Nov. 2, 1954 |